United States Patent
Kokott

(10) Patent No.: US 9,677,630 B2
(45) Date of Patent: Jun. 13, 2017

(54) MOTOR VEHICLE BRAKE DISC CHAMBER

(71) Applicant: Bayerische Motoren Werke Aktiengesellschaft, Munich (DE)

(72) Inventor: Kordian Kokott, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/221,770

(22) Filed: Mar. 21, 2014

(65) Prior Publication Data

US 2014/0202803 A1 Jul. 24, 2014

Related U.S. Application Data

(63) Continuation of application No. PCT/EP2012/068131, filed on Sep. 14, 2012.

(30) Foreign Application Priority Data

Oct. 21, 2011 (DE) .......... 10 2011 084 947

(51) Int. Cl.
  F16D 65/12 (2006.01)
  F16D 65/02 (2006.01)

(52) U.S. Cl.
  CPC ........... F16D 65/121 (2013.01); F16D 65/12 (2013.01); F16D 65/123 (2013.01); F16D 2065/1316 (2013.01); F16D 2200/003 (2013.01)

(58) Field of Classification Search
  CPC ........... F16D 65/123; F16D 2065/1316
  See application file for complete search history.

(56) References Cited

U.S. PATENT DOCUMENTS

| | | | |
|---|---|---|---|
| 2,769,512 A * | 11/1956 | Tack | 188/218 XL |
| 3,393,775 A * | 7/1968 | Hollins | F16D 65/12 |
| | | | 188/218 XL |
| 2003/0121733 A1* | 7/2003 | Niebling et al. | 188/18 A |
| 2004/0134720 A1* | 7/2004 | Niebling et al. | 188/18 A |
| 2009/0020379 A1* | 1/2009 | Hanna et al. | 188/218 XL |
| 2009/0078515 A1 | 3/2009 | Xia | |
| 2012/0037467 A1* | 2/2012 | Kokott et al. | 188/218 XL |

(Continued)

FOREIGN PATENT DOCUMENTS

| | | |
|---|---|---|
| CN | 101391296 A | 3/2009 |
| DE | 2 101 428 A1 | 10/1971 |
| DE | 80 26 664 U1 | 1/1981 |

(Continued)

OTHER PUBLICATIONS

International Search Report (PCT/ISA/210) with English transaltion dated Dec. 13, 2012 (Six (6) pages).

(Continued)

*Primary Examiner* — Bradley King
(74) *Attorney, Agent, or Firm* — Crowell & Moring LLP

(57) ABSTRACT

A brake disk chamber has an essentially cylindrical brake disk chamber jacket without openings. The brake disk chamber jacket is formed of segments in the shape of curved symmetrical trapezoids, which are lined up in a row in the circumferential direction, are alternately rotated by 180°, and are arranged in a regular fashion with an alternately differing radial distance from the longitudinal center axis of the brake disk chamber jacket.

8 Claims, 3 Drawing Sheets

(56) References Cited

U.S. PATENT DOCUMENTS

| | | | |
|---|---|---|---|
| 2013/0032440 A1* | 2/2013 | Karl et al. ............ | 188/218 XL |
| 2014/0124308 A1* | 5/2014 | Kim et al. ............ | 188/218 XL |

FOREIGN PATENT DOCUMENTS

| | | |
|---|---|---|
| DE | 196 48 582 A1 | 5/1998 |
| DE | 100 32 972 A1 | 1/2002 |
| DE | 100 32 972 B4 | 4/2004 |
| DE | 10 2007 041 661 A1 | 3/2008 |
| DE | 10 2009 017 233 A1 | 10/2010 |
| DE | 10 2009 017 234 A1 | 10/2010 |
| EP | 0 726 406 A1 | 8/1996 |
| GB | 1 333 561 | 10/1973 |
| WO | WO 2010/115527 A1 | 10/2010 |

OTHER PUBLICATIONS

German Search Report with English translation dated Jul. 25, 2012 (Ten (10) pages).

Chinese-language Office Action dated Aug. 20, 2015 with English translation (Eight (8) pages).

* cited by examiner

MOTOR VEHICLE BRAKE DISC CHAMBER

CROSS REFERENCE TO RELATED APPLICATIONS

This application is a continuation of PCT International Application No. PCT/EP2012/068131, filed Sep. 14, 2012, which claims priority under 35 U.S.C. §119 from German Patent Application No. 10 2011 084 947.5, filed Oct. 21, 2011, the entire disclosures of which are herein expressly incorporated by reference.

BACKGROUND AND SUMMARY OF THE INVENTION

The invention relates to a brake disc chamber for a motor vehicle having an essentially cylindrical brake disc chamber jacket without openings.

Composite brake discs are known, which have friction rings made of gray cast iron, connected with a brake disc chamber made of light metal. German Patent document DE 100 32 972 B4 describes a brake disc constructed in such a fashion, where the friction ring and the chamber are joined by separate elements, such as pins, screws, etc. In this case, the brake disc chamber has a floor, i.e. the chamber disc, a surrounding wall, i.e. the chamber jacket, and an edge, i.e. the chamber edge. The brake disc chamber is made of a high-strength steel material. The friction ring is fastened to the chamber edge by way of fastening devices, such as screws and/or rivets.

It is an object of the present invention to provide a brake disc chamber, mainly for a motor vehicle, which has a low weight and can nevertheless be highly stressed, mainly with respect to torsion.

According to the invention, this and other objects are achieved by a brake disc chamber having an essentially cylindrical brake disc chamber jacket without openings, wherein the brake disc chamber jacket includes segments in the shape of bent symmetrical trapezoids, which are aligned in the circumferential direction, are alternately rotated by 180°, and are arranged regularly with an alternately differing radial distance from a longitudinal center axis of the brake disc chamber jacket. This has the advantage that, constructively, a particularly light brake disc chamber can be designed, while the course of the tension under a load in the profile of the brake disc chamber jacket is simultaneously advantageous as a result of the use of these thrust areas in a trapezoidal shape.

Further advantageous embodiments of the invention are characterized in that, on the brake disc chamber edge, short sides of the symmetrical trapezoids are, in each case, situated at fastening devices for a fastening ring for fastening a friction ring. These symmetrical trapezoids have a shorter radial distance from the longitudinal center axis of the brake disc chamber jacket. At the brake disc chamber edge, the long sides of the symmetrical trapezoids are, in each case, situated at recesses in the brake disc chamber edge for the fastening extensions of the friction ring. These symmetrical trapezoids have a greater radial distance from the longitudinal center axis of the brake disc chamber jacket.

As a result, a particularly light brake disc chamber can be constructed with a simultaneously advantageous diffusion of stress in the profile of the brake disc chamber jacket by using these thrust areas.

Furthermore, the brake disc chamber jacket can be reinforced by a chamber disc extending in the radial direction, particularly at the end of the brake disc chamber jacket that is farther away from the friction ring, which also contributes to increasing the strength of the brake disc chamber.

When the brake disc chamber is optimized because of its constructive setup with respect to its strength properties, the brake disc chamber jacket and/or the chamber disc can also consist of a light-metal alloy, which results in a considerable weight savings. When both are advantageously cast together in one operation, the manufacturing of the brake disc chamber will be very inexpensive. The weight is thereby enormously reduced in comparison to the use of gray cast iron or steel materials.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
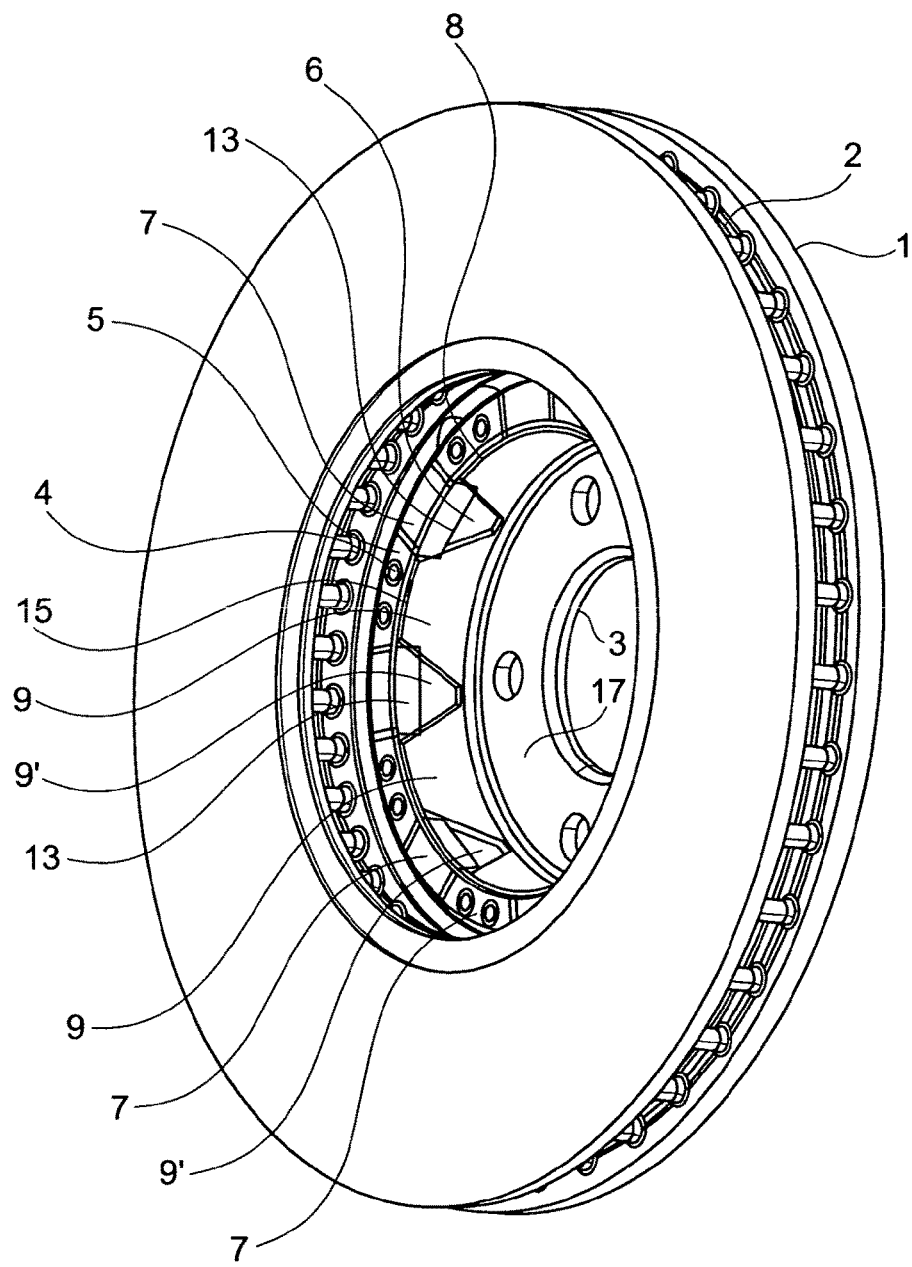
FIG. 1 is a three-dimensional perspective representation of an exemplary brake disc having a brake disc chamber according to the invention.
Figure 2:
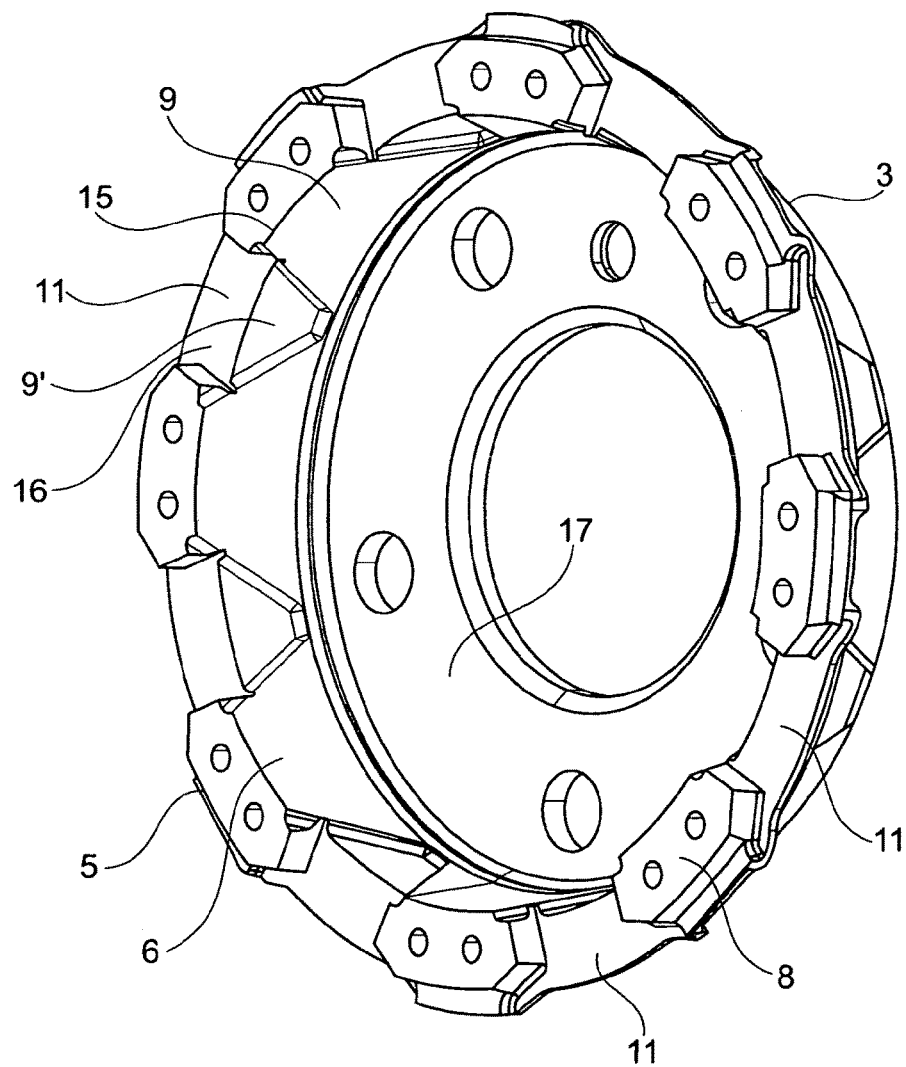
FIG. 2 is a three-dimensional perspective view of the brake disc chamber of FIG. 1 with the illustrated friction ring.
Figure 3:
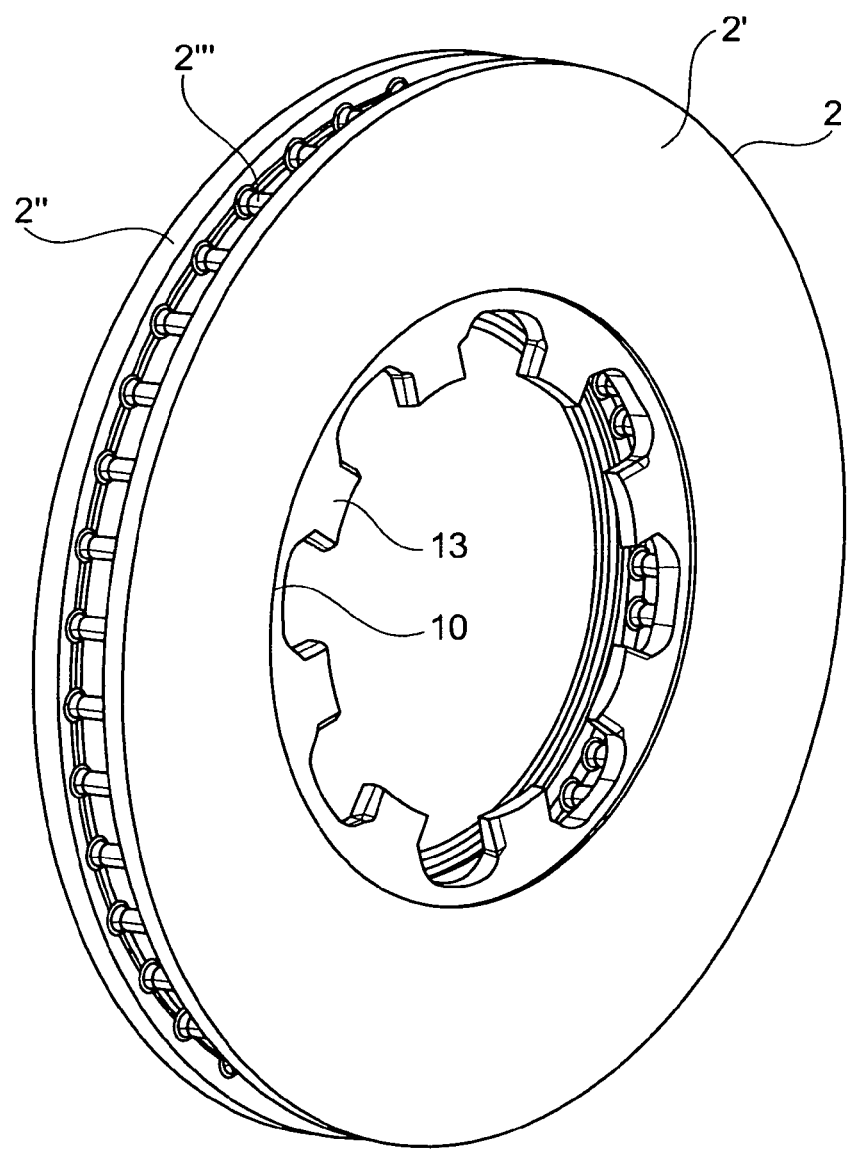
FIG. 3 is a three dimensional perspective view of the friction ring of FIG. 1 with the illustrated brake disc chamber.

The brake disc 1, the brake disc jacket 3 and the friction ring 2, respectively illustrated on a different scale in FIGS. 1 to 3, are assigned to a wheel hub, which is not shown, around an axle, which is also not shown, and extends in the center. In the figures, the same reference numbers mark identical parts.

FIG. 3 illustrates that the one-piece internally cooled friction ring 2 made of gray cast iron includes cooling air ducts 2''' which are situated in-between friction surfaces 2', 2'' and connect the latter. The centering and fastening extensions 13 of the friction ring 2 are located on only one friction disc 2', specifically on the friction disc 2' which, after the mounting, faces the brake disc chamber 3, which is made of a light-metal alloy. Viewed from the friction ring 2, this brake disc chamber 3 extends essentially in one direction (FIG. 3).

The brake disc 1 for a disc brake consists of a brake disc chamber 3 and a friction ring 2, which is fastened thereto. The friction ring 2 is fastened with eight centering and fastening extensions 13, which extend radially inward from an inner diameter 10, on the face side, onto centering extensions of the brake disc chamber 3. The centering extensions of the brake disc chamber 3 are designed as recesses 11 in the brake disc chamber edge 5 and in the brake disc chamber jacket 6. One centering and fastening extension 13, respectively, projects into a corresponding recess 11.

Disposed on the eight centering and fastening extensions 13 of the friction ring 2, which project over the recesses 11 by 5.0 mm in the axial direction at the friction-ring-side end of the brake disc chamber 3, a fastening ring 7 is fixed to the circular-ring elements 8 of the brake disc chamber edge 5 situated between the centering and fastening extensions 13 by means of rivets 4 extending in the axial direction. The fastening ring 7 extends over the entire brake disc chamber edge 5 and covers its recesses 11 by means of the centering and fastening extensions 13 of the friction ring 2 and the circular-ring elements 8 of the brake disc chamber edge 5 situated in-between. As a result, the brake disc chamber 3 and the friction ring 2 are fixed to one another at least in the axial direction, whereby a type of floating bearing is created in the radial direction which permits different radial expansion movements because of a heating of the brake disc 1 without building up high tensions between the brake disc chamber 3 and the friction ring 2. This is also a result of the fact that the centering and fastening extensions 13 of the friction ring together with the recesses 11 in the brake disc chamber 3 form a clearance fit in the circumferential direction.

As a result of the fact that the recesses 11 in the brake disc chamber 3 are 0.5 mm less deep than the depth of the centering and fastening extensions 13 in the axial direction, the fastening ring 7 will wave when it is riveted to the brake disc chamber edge 5, which makes the fastening connection free of play and slightly flexible in the axial direction.

FIG. 2 illustrates that the brake disc chamber 3 is designed such that no undercuts whatsoever are present and the brake disc chamber 3 can therefore easily be produced by two corresponding die halves by casting from light metal. The brake disc chamber jacket 6 is reinforced by a chamber disc 17 extending in the radial direction at the end of the brake disc chamber jacket 6 which is farther away from the friction ring 2.

The essentially cylindrical brake disc chamber jacket 6 consists of segments 9, 9' in the shape of curved symmetrical trapezoids, which are aligned in the circumferential direction, are alternately rotated by 180° and are arranged in a regular fashion with an alternately differing radial distance from the longitudinal center axis (not shown) of the brake disc chamber jacket 6. In this case, at the brake disc chamber edge 5, the short sides 15 of the curved symmetrical trapezoids 9 are, in each case, situated at the fastening devices (such as rivets) for the fastening ring 7, and these symmetrical trapezoids 9 are at the shorter radial distance from the longitudinal center axis of the brake disc chamber jacket 6. In contrast, the long sides 16 of the curved symmetrical trapezoids 9' at the brake disc chamber edge 5 are, in each case, situated at the recesses 11 in the brake disc chamber edge 5, and these symmetrical trapezoids 9' are at the larger radial distance from the longitudinal center axis of the brake disc chamber jacket 6.

The trapezoidal segments 9, 9' of the brake disc chamber jacket 6 represent thrust areas, which increase the fatigue strength while the weight is simultaneously reduced because of the savings of material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disc chamber of a brake disc, comprising:
an essentially cylindrical brake disc chamber jacket, said jacket being without openings, wherein
the essentially cylindrical brake disc chamber jacket is formed of a plurality of symmetrical curved trapezoidal segments,
the plurality of symmetrical curved trapezoidal segments being substantially aligned in a circumferential direction, alternating segments being rotated by 180 degrees,
the alternating segments are arranged so that some of the plurality of symmetrical curved trapezoidal segments are radially separated from a longitudinal center axis of the essentially cylindrical brake disc chamber jacket by a first distance, and others of the plurality of symmetrical curved trapezoidal segments are radially separated from the longitudinal center axis of the essentially cylindrical brake disc chamber jacket by a second distance that is different than the first distance, and
the some of the plurality of symmetrical curved trapezoidal segments are configured to make contact with a brake rotor, and the others of the plurality of symmetrical curved trapezoidal segments are configured to not make contact with the brake rotor.

2. A brake disc chamber of a brake disc, comprising:
an essentially cylindrical brake disc chamber jacket, said jacket being without openings, wherein
the cylindrical jacket is formed of a plurality of symmetrical curved trapezoidal segments,
the segments being substantially aligned in a circumferential direction, alternating segments being rotated by 180 degrees, and
alternating segments being arranged at different radial distances from a longitudinal center axis of the brake disc chamber jacket, wherein
the symmetrical curved trapezoidal segments that are at a first radial distance from the longitudinal center axis of the brake disc chamber jacket have short sides at an edge of the jacket located at fastening devices for a fastening ring used to fasten a friction ring of the brake disc, and
the symmetrical curved trapezoidal segments that are at a second radial distance from the longitudinal center axis of the brake disc chamber jacket, the second distance being greater than the first distance, have long sides at the edge of the jacket located at recesses in the edge, the recesses being configured for fastening extensions of the friction ring of the brake disc.

3. The brake disc chamber according to claim 1, further comprising:
a chamber disc arranged at one axial end of the essentially cylindrical brake disc chamber jacket, the chamber disc being oriented in a radial direction with respect to the longitudinal center axis of the essentially cylindrical brake disc chamber jacket.

4. The brake disc chamber according to claim 3, wherein the chamber disc is arranged at the end of the essentially cylindrical brake disc chamber jacket away from the end on which a friction ring is fastened.

5. The brake disc chamber according to claim 2, further comprising:
a chamber disc arranged at one axial end of the brake disc chamber jacket, the chamber disc being oriented in a radial direction with respect to the longitudinal center axis.

6. The brake disc chamber according to claim 5, wherein the chamber disc is arranged at the end of the brake disc chamber jacket away from the end on which the friction ring is fastened.

7. The brake disc chamber according to claim 1, wherein the essentially cylindrical brake disc chamber jacket is formed of a light alloy.

8. The brake disc chamber according to claim 1, wherein the alternating segments do not directly overlap along the circumferential direction.

* * * * *